April 22, 1924.
J. S. ALSPAUGH
GEAR SHIFT MECHANISM
Filed Dec. 11, 1920
1,491,283
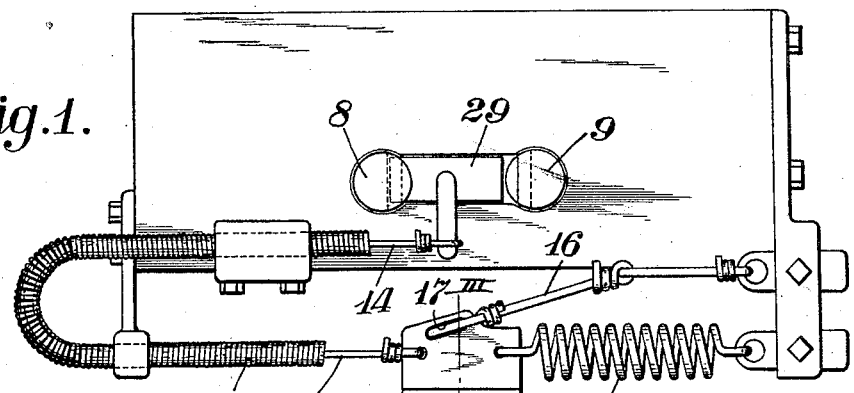
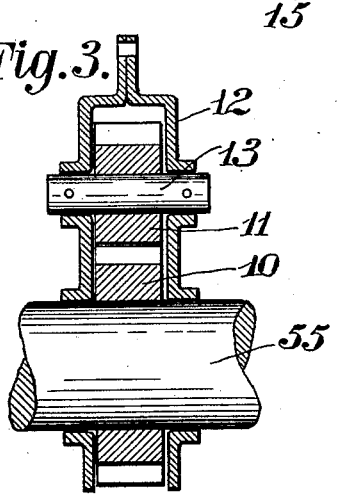
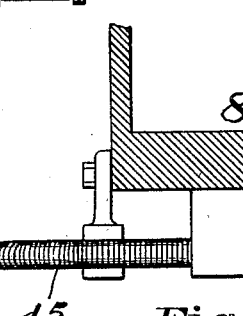
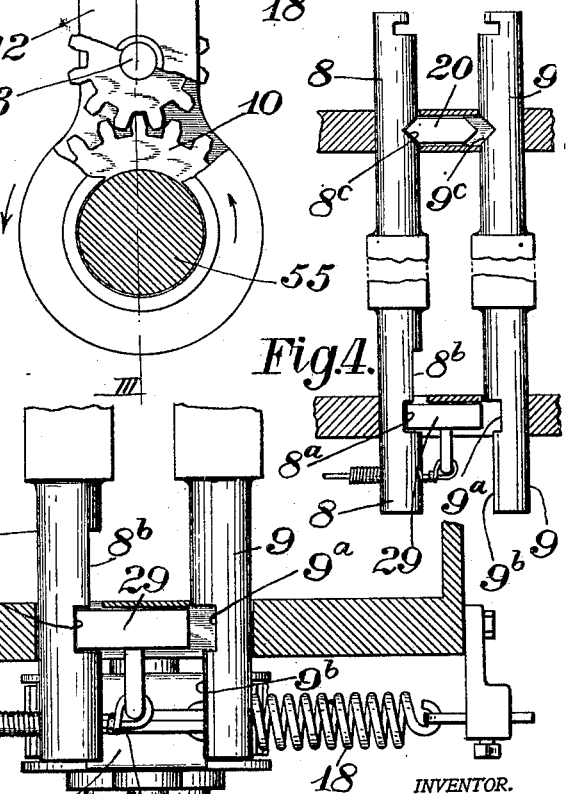
INVENTOR.
James S. Alspaugh
BY
his ATTORNEYS.

Patented Apr. 22, 1924.

1,491,283

UNITED STATES PATENT OFFICE.

JAMES S. ALSPAUGH, OF PORTSMOUTH, OHIO.

GEAR-SHIFT MECHANISM.

Application filed December 11, 1920. Serial No. 429,027.

*To all whom it may concern:*

Be it known that I, JAMES S. ALSPAUGH, a citizen of the United States, residing at Portsmouth, in the county of Scioto and State of Ohio, have invented a certain new and useful Improvement in Gear-Shift Mechanism, of which the following is a specification.

The present invention is useful in connection with mechanism like that shown in the patent issued to me February 19, 1919, No. 1,257,064 and in my application for patent filed November 14, 1917, S. No. 201,889, and the patent to be issued thereon.

The object of the invention generally, is to provide a simplified construction in which is avoided the necessity for added hand-setting mechanism to determine which of the gear shift rods is to be operated and in which the operation of the gear shift mechanism is performed and controlled wholly by the foot and the motion or absence of motion of the vehicle.

The invention as herein exemplified, is more especially applicable to motor vehicles having a clutch and gear shift mechanism such as used, for example, in the "Cadillac" car. In referring to the various positions of the rods and speeds obtained with such a gear shift mechanism I shall denominate them as low, intermediate, high and reverse. In such mechanism the propeller shaft either drives the vehicle, or the motion of the vehicle, as in coasting down hill, drives the propeller shaft. In the present instance I utilize the motion of the propeller shaft to lock the low and reverse gear shift rod and unlock the intermediate and high speed rod, so that when the vehicle is at rest the low and reverse gear shift rod is free to be operated; but when the car is in forward motion the intermediate and high gear shift rod are free to be operated.

In the accompanying drawings forming part hereof—

Figure 1 is an end elevation of the case or frame for the gear shift rods showing a lock for the rods and mechanism for actuating the same, a part being broken out and the propeller shaft being in section.

Fig. 2 is a top plan view of the parts seen in Fig. 1.

Fig. 3 is a section on the line III—III Fig. 1.

Fig. 4 is a plan view with parts in section on a smaller scale and broken out at the middle showing the lock that is actuated by the propeller shaft and a second lock for holding one of the gear shift rods in neutral position when the other is moved from neutral position.

In the views 8 and 9 are the usual gear shift rods mounted in a box-like frame, the rod 8 being that for actuating the speed change gear to secure intermediate and high speeds and the rod 9 being that to secure low and reverse. In the present instance, however, the rod 9 at its end is provided with a notch 9ª and a cutaway portion 9ᵇ extending rearward from the notch and the rod 8 with a notch 8ª with a cutaway portion 8ᵇ extending forward from said notch. The notches and cutaway portions face toward each other and in the wall of the box-like frame is a latch piece 29 adapted to be shifted to engage either notch but not both at the same time.

20 designates a second latch in the forward wall of the box-like frame. This latch has beveled ends to enter notches 8ᶜ and 9ᶜ in the rods 8 and 9. This latch is of such length that it is held engaged with either of the notches it occupies after the other rod is moved.

Secured on the propeller shaft 55 to rotate therewith is a spur gear 10 meshing with a smaller spur gear 11 carried in a yoke 12 loosely encircling the propeller shaft. The smaller gear 11 turns loose on its shaft 13, the latter being pinned to the yoke. The yoke 12 is connected with the latch by means of a stout flexible wire 14 passed through a tube 15 so that when the yoke is swung to the left (Fig. 1) the latch is pushed to the right. The yoke is also connected with a stationary part by means of a spring 18 tending normally to hold the latch 29 engaged with the shaft 8. The oscillation of the yoke is limited in both directions by means of the looped end of a wire 16 engaging a slot 17 in the upper end of the yoke. When the vehicle is in forward motion the propeller shaft rotates anti-clockwise or in a direction of the arrow on Fig. 1. It follows that the propeller shaft is not rotated until the "low" or "reverse" are engaged. When at rest the parts are in the position shown in the views—that is the low and reverse rod 9 is free to be operated. When the "low" is engaged the propeller shaft is turned in the direction of the arrow and the yoke moved to the left as far as permitted by slot 17 thereby disengaging the latch 29 from rod 8 and impinging it against flat portion 9ᵇ of rod 9, but in position to prevent movement of that rod to reverse until the vehicle is first brought to rest. When the vehicle is at rest the rod is free to be moved into reverse because latch 29 was retracted by spring 18. The engagement in reverse does not operate the yoke because of the stop 16 in slot 17. After the rod 9 has been shifted into low the rod 8 is free to be moved rearward into second or intermediate. In this movement the rod 9 is restored to neutral position. When the rod 8 is shifted the latch 20 is automatically thrown by reason of the beveling contact into engagement with the rod 9 and when the rod 8 is restored to neutral, the operation of rod 9 in like manner throws latch 20 into engagement with rod 8. Thus when either rod has been shifted from the neutral position the other is latched from movement and neither rod can be shifted from neutral unless the other is in or is brought to neutral position.

Any suitable means can be employed for shifting the rods and the forms of the parts can be changed without departing from the invention as claimed.

What I claim is:

1. In a motor vehicle speed changing mechanism the combination with a pair of gear shifting rods, a latch for said rods, means geared with the propeller shaft for actuating said latch in one direction and a spring for actuating said latch in the opposite direction.

2. In a motor vehicle speed changing mechanism, the combination with a pair of gear shifting rods, a latch for said rods, means geared with the propeller shaft for actuating said latch in one direction and a spring for actuating said latch in the opposite direction and means whereby the actuation of said latch by the propeller shaft is limited.

3. In a motor vehicle speed changing mechanism, the combination with a pair of gear shifting rods, a latch for said rods and means controlled by the operation of the propeller shaft for actuating said latch to lock either of said rods and release the other rod and a second latch actuated automatically by the movement of the released rod to latch the other rod in neutral position.

4. In a motor vehicle speed changing mechanism, the combination with a pair of gear shifting rods having latch receiving portions and cutaway portions extending in opposite directions therefrom, a latch for said rods, means geared with the propeller shaft for actuating said latch in one direction and a spring for actuating said latch in the opposite direction.

5. In a motor vehicle speed changing mechanism, the combination with a pair of gear shifting rods, a latch for said rods, means geared with the propeller shaft for actuating said latch in one direction, a spring actuating said latch in the opposite direction and means whereby the actuation of said latch by the propeller shaft and spring are limited.

6. In a motor vehicle speed changing mechanism, the combination with a pair of gear shifting rods, a latch for said rods and means geared with the propeller shaft for actuating said latch to lock either of said rods and release the other, means for preventing the latching of the released rod by said latch until such rod is brought to neutral position, and a second latch actuated automatically by the movement of one rod from neutral position to latch the other in neutral position.

7. In a motor vehicle speed changing mechanism, the combination with a pair of gear shifting rods, a latch for said rods and means controlled by the operation of the propeller shaft for actuating said latch to lock one of said rods.

JAMES S. ALSPAUGH.